(No Model.)

J. S. MacARTHUR.
METALLURGICAL FILTER.

No. 418,138. Patented Dec. 24, 1889.

WITNESSES
Harry King
C. A. Weed.

INVENTOR
John Stewart MacArthur,
By F. C. Somes,
Attorney

UNITED STATES PATENT OFFICE.

JOHN STEWART MacARTHUR, OF POLLOKSHIELDS, COUNTY OF RENFREW, SCOTLAND.

METALLURGICAL FILTER.

SPECIFICATION forming part of Letters Patent No. 418,138, dated December 24, 1889.

Application filed November 13, 1889. Serial No. 330,195. (No model.)

*To all whom it may concern:*

Be it known that I, JOHN STEWART MAC-ARTHUR, a subject of the Queen of Great Britain, residing at Pollokshields, in the county of Renfrew, Scotland, have invented a new and useful Improvement in Metallurgical Filters, of which the following is a specification.

This invention relates to a filter for precipitating and separating precious metals from solutions containing them—such, for instance, as chlorides, bromides, theosulphates, (sometimes called "hyposulphites,") or sulphates obtained in the well-known Plattner, von Patera, Russell, Ziervogel, and Augustine extracting processes.

The object of the invention is to provide a filter having a large active surface for the metals in solution.

Figure 1:
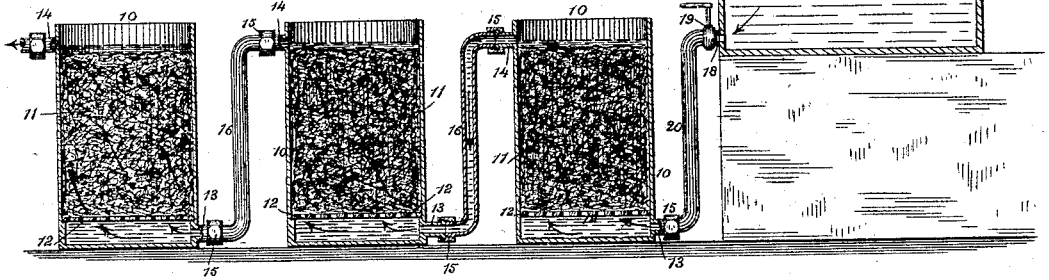
Figure 2:
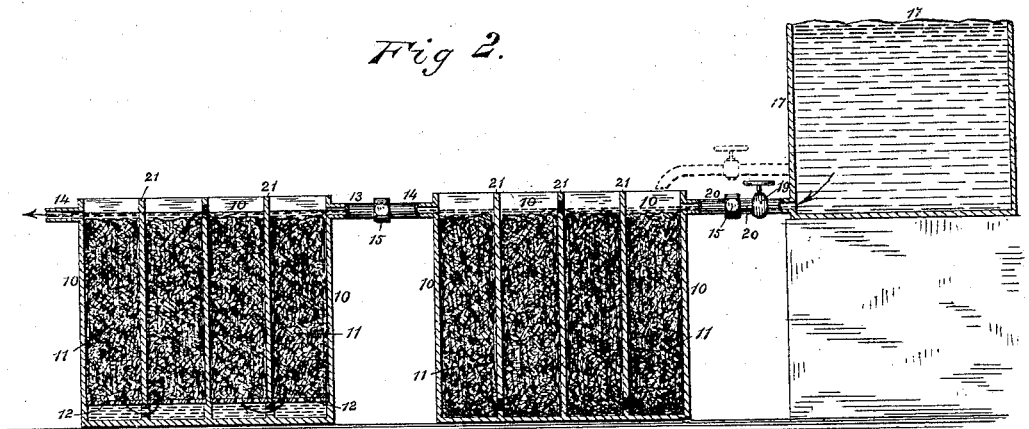
Figure 3:

In the accompanying drawings, Figure 1 is a sectional elevation of a series of these improved filters. Fig. 2 is a longitudinal vertical section of a filtering apparatus comprising two of these improved filters constructed in modified form. Fig. 3 represents a zinc filiform sponge, constituting the principal feature of this improved filter, the filaments of the sponge being represented on an enlarged scale.

Similar numerals of reference indicate corresponding parts in the different figures.

This improved filter comprises a containing-vessel 10 and a zinc sponge 11, disposed therein. The zinc sponge is preferably supported on a perforated false bottom 12, disposed within said vessel near the bottom proper thereof. The vessel is provided with an inlet-tube 13 and an outlet-tube 14, the inlet-tube being preferably disposed near the bottom of the vessel and the outlet-tube near the top thereof, each of said tubes being provided with a coupling-nut 15 when the vessels are used in series.

A number of these filters are preferably arranged in series, as represented in Fig. 1, from six to ten being ordinarily employed. When so arranged, the filters are connected by pipes 16, which extend from the outlet near the top of one vessel to the inlet near the bottom of the adjacent vessel. A reservoir or tank 17 for containing the solution holding the precious metals is disposed adjacent to the first filter of the series and elevated a sufficient distance to secure a proper flow of the liquid through the filters. This tank is provided with an outlet-tube 18 near its bottom, said tube being provided with a stop-cock 19, and connected by pipe 20 with the inlet-tube of the first filter of the series. The zinc sponge, which constitutes the filtering material and precipitant, is preferably composed of fine threads or filaments of zinc interlocked together. The zinc threads from which the sponge is formed are cut by a turning-tool from a series of zinc disks held between lathe-centers and turned; or the zinc sponge may be formed by passing molten zinc, at a temperature just above the melting-point, through a fine sieve and allowing it to fall into water. This improved zinc sponge presents a very large contact-surface for the action of the solution, and it does not become easily choked. Each containing-vessel may be provided with a vertical partition or partitions 21, as illustrated in Fig. 2, whereby the vessel is divided into two or more compartments or filtering-chambers. These partitions extend to a point near the bottom or top of the vessel, as the case may be, or they are provided with holes near the top or near the bottom of the vessel. In case the vessel has three or more filtering-chambers, the partitions are provided with communicating-openings, disposed alternately near the bottom and top of the vessel, whereby the passage of the solution is downward through one of the filtering-chambers, upward through the adjoining filtering-chamber, and downward again through the third filtering-chamber, and so on.

In the use of this improved filtering apparatus the solution containing the precious metal is placed in the tank 17 and the cock 19 is opened. In case a series of separate filters is employed, as represented in Fig. 1, the solution passes from the tank through the pipe 20 and into the first filter of the series, near the bottom thereof, beneath the false bottom 12, thence upward through the zinc sponge within the filter, thence outward near the top of the first filter, thence through the connecting-pipe to the next filter of the series, where it again enters near the bottom and passes upward through the zinc sponge to the top of the second filter of the series, and so on. The metal which is not precipitated by the first filter is caught in the zinc sponge of the succeeding filters of the series.

In case filters having a number of compartments are employed, the solution is preferably admitted to the first compartment at the top thereof, and passes down through the zinc sponge contained in said compartment to near the bottom thereof, and thence passes into the second compartment and upward through the zinc sponge therein contained to near the top of said compartment, and thence downward through the next compartment, and so on through the several compartments of the compound filter, and thence to the next compound filter of the series and through its several compartments. The precious metal may be separated from the zinc sponge by distillation, or the zinc sponge containing the precious metal may be placed in a suitable sieve and subjected to a screening operation, preferably under water. In this operation the greater part of the precious metal will pass through the sieve and the greater part of zinc sponge will remain therein.

I claim as my invention—

1. A metallurgical filter for separating a precious metal from a solution containing said metal, consisting of a vessel provided with inlet and outlet openings, and a zinc sponge disposed in said vessel between said openings, substantially as described.

2. A metallurgical filter for separating a precious metal from a solution containing said metal, consisting of a vessel provided with inlet and outlet openings and a filiform zinc sponge disposed in said vessel between said openings, substantially as described.

3. A metallurgical filter for separating a precious metal from a solution containing said metal, consisting of a vessel provided with a perforated false bottom, a zinc sponge within said vessel above said false bottom, and inlet and outlet openings above and below said sponge, substantially as described.

4. A metallurgical filter for separating a precious metal from a solution containing said metal, consisting of a vessel provided with a perforated false bottom, a filiform zinc sponge within said vessel above said false bottom, and inlet and outlet openings above and below said filiform sponge, substantially as described.

5. A metallurgical filtering apparatus for separating a precious metal from a solution containing said metal, consisting of a series of vessels, a zinc sponge in each of said vessels, pipes connecting the outlet-tube of one vessel of the series with the inlet-tube of the adjacent vessel of the series, and a reservoir for supplying the solution to the first vessel of the series, substantially as described.

6. A metallurgical filtering apparatus for separating a precious metal from a solution containing said metal, consisting of a series of vessels, each of which has an inlet-tube near its bottom, an outlet-tube near its top, and a perforated false bottom above the inlet-tube, zinc sponges disposed in the several vessels, pipes connecting the inlet and outlet tubes of the several vessels, and a reservoir for supplying the solution to the first vessel of the series, substantially as described.

7. A metallurgical filter for separating a precious metal from a solution containing said metal, consisting of a vessel provided with a partition dividing said vessel into a plurality of filtering-chambers, said partition being provided with openings near one end, and zinc sponges disposed in said compartments, substantially as described.

JOHN STEWART MacARTHUR.

Witnesses:
F. C. SOMES,
GORDON WILSON, Junr.